United States Patent
Basturk et al.

(10) Patent No.: US 6,938,095 B2
(45) Date of Patent: Aug. 30, 2005

(54) METHOD AND APPARATUS FOR ESTABLISHING AND SHARING A VIRTUAL CHANGE NOTIFICATION LIST AMONG A PLURALITY OF PEER NODES

(75) Inventors: Erol Basturk, Cupertino, CA (US); Vivek Menezes, Burlingame, CA (US)

(73) Assignee: Pluris, Inc., Cupertino, CA (US)

( * ) Notice: Subject to any disclaimer, the term of this patent is extended or adjusted under 35 U.S.C. 154(b) by 529 days.

(21) Appl. No.: 10/104,884

(22) Filed: Mar. 21, 2002

(65) Prior Publication Data

US 2002/0165981 A1 Nov. 7, 2002

Related U.S. Application Data

(63) Continuation-in-part of application No. 09/606,377, filed on Jun. 28, 2000.

(51) Int. Cl.[7] ............................................. G06F 15/173
(52) U.S. Cl. .................. 709/238; 709/201; 709/224; 709/239; 709/242; 370/351; 370/395.31; 710/10; 710/15; 710/62; 710/72; 710/220
(58) Field of Search ................................ 709/201, 224, 709/238, 239, 242; 705/9; 370/351, 395.31; 710/10, 15, 220, 62, 65, 72

(56) References Cited

U.S. PATENT DOCUMENTS

| | | | | |
|---|---|---|---|---|
| 5,951,649 A | * | 9/1999 | Dobbins et al. ............ 709/238 |
| 6,144,987 A | * | 11/2000 | Niemi ......................... 709/201 |
| 6,185,613 B1 | * | 2/2001 | Lawson et al. .............. 709/224 |
| 6,345,288 B1 | | 2/2002 | Reed et al. |
| 6,490,273 B1 | | 12/2002 | Denap et al. |
| 6,560,655 B1 | | 5/2003 | Grambihler et al. |
| 6,643,706 B1 | * | 11/2003 | Marques et al. ............ 709/242 |
| 6,728,779 B1 | * | 4/2004 | Griffin et al. ............... 709/239 |
| 6,760,777 B1 | * | 7/2004 | Agarwal et al. ............ 709/238 |
| 2002/0116248 A1 | * | 8/2002 | Amit et al. .................... 705/9 |

OTHER PUBLICATIONS

U.S. Appl. No. 09/606,377, Puneet Agarwal et al.

* cited by examiner

*Primary Examiner*—Hosain Alam
*Assistant Examiner*—ThuHa Nguyen
(74) *Attorney, Agent, or Firm*—Donald R. Boys; Central Coast Patent Agency, Inc.

(57) ABSTRACT

A data structure has a list of event objects, one or more producers creating the event objects for the list, and a finite set of consumers accessing the object list. The structure is characterized in that the event objects are each associated with a first reference number indicating the number of consumers currently accessing the event object, and in that, as each consumer completes access the reference number is decremented, and when the reference number for an event object is zero, and the event object is at the head of the list, indicating that all consumers have accessed the object, that event object is removed from the list. A use of the structure for propagating route changes to nodes in a multiple-processor router, and to peer routers in a network is also taught.

20 Claims, 15 Drawing Sheets

VCN Having 8 consumers, 2 real events, and 3 shadow events

METHOD AND APPARATUS FOR ESTABLISHING AND SHARING A VIRTUAL CHANGE NOTIFICATION LIST AMONG A PLURALITY OF PEER NODES

CROSS-REFERENCE TO RELATED DOCUMENTS

The present application is a continuation in part (CIP) a U.S. patent application Ser. No. 09/606,377 entitled "Methods and Apparatus for Synchronizing and Propagating Distributed Routing Databases" filed on Jun. 28, 2000, disclosure of which is included herein by reference.

FIELD OF THE INVENTION

The present invention is in the field of data routing over a data packet network and pertains particularly to methods and apparatus for optimizing messaging between routing components and peer components with regard to additions, deletions, and modifications to entries in a routing table.

BACKGROUND OF THE INVENTION

In the context of internetworking, routing is the coordinated transfer of information from a source to a destination via hardware known as a router. Routing occurs at Layer 3, the network layer of the Open System Interconnection (OSI) reference model of the International Society for Standardization (ISO). The OSI reference model is a conceptual model composed of seven layers, each specifying particular network functions. The two lowest layers (layers 1 and 2) of the OSI model, namely the physical and data link layers are implemented in both hardware and software. Layer 3 and those above are generally implemented only in software.

Using ISO terminology, network devices may be classified as follows. Those devices with the capability to forward packets between sub networks are referred to as intermediate systems (ISs). In contrast, network devices without such capabilities are called end systems (ESs). Intermediate systems may be classified as intradomain ISs, i.e., those which can communicate within routing domains, and interdomain ISs which can communicate both within and between routing domains. A routing domain, or autonomous system, can be considered to be a part of an internetwork, which is regulated under common administrative authority.

A key component of routing is determination of optimal routing paths for data packets. Thereafter a second component, which may be referred to as "forwarding", comprises transporting packets through the internetwork. Determination of optimal routing paths relies on one or more routing protocols to provide and update a routing database for each router or peer in a network. Depending on the particular routing protocol(s) used, various metrics are involved in building the routing database. Metrics that may be used by various routing protocols, either singly or as components of hybrid metrics, including: bandwidth, cost, path length, reliability, and load. Such metrics are well known in the art.

Routing protocols are used to determine best routes for transporting packets through an internetwork. Routing in a network can be classified as either dynamic or static. Static routing is accomplished by using table mappings, which are entered by a user (e.g. network administrator) prior to routing, and are only changed by user input. Dynamic routing is accomplished by routing protocols that adjust to changing network conditions in response to incoming route update information. As a result, routes are recalculated, new routing update messages are sent out to peer routers, and updated routing databases are constructed. Routing protocols may be interior or exterior. Conventionally, interior routing protocols are used for determining routes within a routing domain. Examples of interior routing protocols are Routing Information Protocol (RIP) and Open Shortest Path First (OSPF). Exterior routing protocols exchange routing information between routing domains. Examples of exterior routing protocols are Border Gateway Protocol (BGP) and Exterior Gateway Protocol (EGP).

OSPF is a unicast routing protocol that requires each router in a network to be aware of all available links in the network. OSPF calculates routes from each router running the protocol to all possible destinations in the network. Intermediate System to Intermediate System (IS—IS) is an OSI link-state hierarchical routing protocol based on DECnet Phase V routing, whereby ISs (routers) exchange routing information based on a single metric, to determine network topology.

BGP performs interdomain routing in TCP/IP networks. As an exterior gateway protocol (EGP), BGP performs routing between multiple routing domains and exchanges routing and reach ability information with other BGP systems. Each BGP router maintains a routing database that lists all feasible paths to a particular network. The router does not refresh the routing database, however. Instead, routing information received from peer routers is retained until an incremental update is received. BGP devices exchange routing information upon initial data exchange and after incremental updates. When a router first connects to the network, BGP routers exchange their entire BGP routing tables.

In order to update their routing databases, routers send and receive information regarding network topology. Examples of such information include routing update messages, and link-state advertisements. By communicating with other routers in this way, each router obtains a routing database that defines the current topology of the network of which it is a part, enabling determination of optimal routing path.

Entries are added to and removed from the route database either by the user (e.g., a network administrator) in the form of static routes, or by various dynamic routing protocol tasks. In dynamic routing, routes are updated by software running in the router. The routing database defines a mapping from destination address to logical (output) interface, enabling the router to forward packets along the best route toward their destination. The route database is also the principal medium used to share routes among multiple active routing protocols. Thus, the routing database comprises an essential entity at the heart of every router.

Typically, two or three routing protocols may be active in any one router. The routing database as such is a superset of the set of routes actually used for forwarding packets. This is due, in part, to the fact that different routing protocols compute their preferred routes independently of each other, based on different metrics. Only when all route entries generated by the full complement of routing protocols are shared in the routing database, or route table, can the best routes be selected. The result of this selection is a subset of the routing database commonly referred to as the forwarding table. The forwarding table can be considered a filtered view of the routing database. The forwarding table is used by all entities of the router that have to forward packets in and out of the router.

In a BGP system known to the inventors, change information to entries in a routing table are processed and forwarded to peers running BGP protocol. A BGP module running in a router generally comprises a receiving module for receiving an update and a consumer or peer module for propagating valid changed entries to BGP peers. In basic practice, table entry changes comprise updates of better routes or new route additions and deletions. The transactions or propagations of this information are called notifications. Notifications are queued and sent to peers to update their tables. Pluralities of notifications are kept in what is termed a notification list (NL). A convention known as a network-layer-routing-information (NLRI) is a structure that represents a network prefix for layer 3 routing purposes. A convention known as a network layer route entry (NLRE), in BGP, is a BGP route associated with a particular NLRI. A NLRI can have multiple NLRE associated with it. Optimally, a best NLRE is selected via processing for a NLRI from all of the reachable NLRE listed in the table for that prefix.

A NLRI is marked "changed" if it's best NLRE changes. A NLRI is marked deleted if it is found that there are no longer any reachable NLREs within its network prefix list of entries. A NLRI that has a NLRE added or deleted is considered a change notification (CN). A list of the NLRIs marked changed or deleted but that have not yet been peer-processed is considered to comprise an NLRI outbound queue list or the notification list (NL) introduced above. That is to say that the unprocessed NLRIs are queued for processing and propagation to peers in a FIFO outbound queue.

In a current process known to the inventors, all NLRIs from a routing table that are marked changed or deleted are queued and reviewed. If valid they are converted into outbound data packets and buffered for transmission to peers on a per-peer basis according to a timed advertising interval unique to each peer. The advertising interval is the minimum allowable time period per peer that can expire before a next update of a same prefix or NLRI.

A problem with the way the art is currently practiced is that BGP places every NLRI into outbound packet buffers on a per-peer basis. This means that significant packet buffering circuitry must be provided at the transmit or server side of the transactions. Change notifications are copied multiple times for multiple peers. Moreover peers are forced to accept packets only as fast as the BGP module can create (replicate) and send them. In the event of a busy peer, no inbound data can be processed, which may lead to packet overflow at the outbound packet buffer of that the router on the sender side. The current (and inefficient) way to handle this problem is to slow every peer down in a peer group to the rate of the slowest peer.

Another problem with the way the art is currently practiced is that there is no priority scheme available. For example, a NLRI marked deleted should logically have a higher priority than one marked changed, as it is important to remove non-usable entries from all peers promptly.

What is clearly needed is a method and apparatus that provides a virtual buffer for buffering one set of NLRIs that can be processed simultaneously by all of the peers. A method and apparatus such as this would enable reduction of outbound packet buffering and would allow for the frequency of updates to adjust to the speed at which they can be processed on the receiver end.

SUMMARY OF THE INVENTION

In a preferred embodiment of the present invention a data structure is provided, comprising a list of event objects, one or more producers creating the event objects for the list, and a finite set of consumers accessing the object list. The structure is characterized in that the event objects are each associated with a first reference number indicating the number of consumers currently accessing the event object, and in that, as each consumer completes access the reference number is decremented, and when the reference number for an event object is zero, and the event object is at the head of the list, indicating that all consumers have accessed the object, that event object is removed from the list.

In a preferred embodiment the event objects created represent changes in a data base, and the information associated with each is a statement of the change. Also in a preferred embodiment data base is a routing information base for a portion of a data packet network, and the information associated with each event object is a route change. In some embodiments each event object comprises a reference to the next event object in the list. Also in some embodiments each event object comprises a reference to the next event to be processed by a consumer processing a current event object. In some cases there is a second reference number associated with each event object, initially indicating the number of consumers to access the event object, the number decremented as each consumer accesses the event object.

In another aspect of the invention, in a data router, a virtual output queue system for propagating route change notifications to individual ones of a finite set of peer routers is provided, the system comprising a virtual output queue (VOQ), a facility for entering and deleting change notifications as event objects in the VOQ, and an access module for managing access to the queue on behalf of individual ones of the finite set of peer routers, the access module retrieving event objects from the queue and sending the event objects to the router for which access is made.

In preferred embodiments in this aspect the event objects are each associated with a first reference number indicating the number of peers currently accessing the event object, and, as each peer completes access the reference number is decremented, and when the reference number for an event object is zero, and the event object is at the head of the queue, indicating that all consumers have accessed the event object, that event object is removed from the queue. In some cases each event object comprises a reference to the next event object in the queue. In some other cases each event object comprises a reference to the next event to be processed by a peer processing a current event object. There may also be a second reference number associated with each event object, initially indicating the number of peers yet to access the event object, the number decremented as each peer accesses the event.

In yet another aspect of the invention a method for propagating event objects to a finite set of consumers is provided, comprising the steps of (a) placing the event objects one-at-a-time in a first-in-first-out queue; (b) associating a number with each specific event object in the list, the number indicating the number of consumers in the set currently accessing the specific event object; and (c) decrementing the number associated in step (b) with each event object by one each time a consumer finishes access to that event object, such that, when the number is zero for an event object, and the event object is at the head of the queue, that object has been accessed for all consumers requiring access, and may be removed from the queue.

In preferred embodiments of the method the event objects created represent changes in a data base, and the information associated with each is a statement of the change. Also in preferred embodiments the data base is a routing information base for a portion of a data packet network, and the information associated with each event object is a route change. In some cases each event object comprises a reference to the next event object in the queue, while in other cases each event object comprises a reference to the next event to be processed by a consumer processing a current event object.

In some embodiments there is a second reference number associated with each event object, initially indicating the number of consumers to access the event object, the number decremented as each consumer accesses the event object.

In still another aspect of the invention a method for propagating route changes to a finite set of peer routers is provided, comprising the steps of (a) placing the route changes as event objects one-at-a-time in a first-in-first-out queue; (b) associating a number with each specific event object in the queue, the number indicating the number of peers in the set currently accessing the specific event object; and (c) decrementing the number associated in step (b) with each event object by one each time a peer finishes access to that event object, such that, when the number is zero for an event object, and the event object is at the head of the queue, that object has been accessed for all peers requiring access, and may be removed from the queue.

In some preferred embodiments each event object comprises a reference to the next event object in the queue. In some other embodiments each event object comprises a reference to the next event to be processed by a peer processing a current event object. Instill other embodiments there is a second reference number associated with each event object, initially indicating the number of peers to access the event object, the number decremented as each peer accesses the event object.

In still another aspect of the invention, in a multiple-processor data router, a virtual output queue system for propagating route change notifications to individual ones of a finite set of processor-controlled nodes within the router is provided, the system comprising a virtual output queue (VOQ), a facility for entering and deleting change notifications as event objects in the VOQ, and an access module for managing access to the queue on behalf of individual ones of the finite set of nodes within the router, the access module retrieving event objects from the queue and sending the event objects to the node for which access is made.

In some preferred embodiments the event objects are each associated with a first reference number indicating the number of nodes currently accessing the event object, and in that, as each node completes access the reference number is decremented, and when the reference number for an event object is zero, and the event object is at the head of the queue, indicating that all nodes have accessed the event object, that event object is removed from the queue. In some other embodiments each event object comprises a reference to the next event object in the queue. In still other embodiments each event object comprises a reference to the next event to be processed by a node processing a current event object. In yet other embodiments there is a second reference number associated with each event object, initially indicating the number of nodes to access the event object, the number decremented as each node accesses the event.

In still another aspect of the invention a method for propagating route changes to a finite set of processor-controlled peer nodes in a multiple-processor router is provided, comprising the steps of (a) placing the route changes as event objects one-at-a-time in a first-in-first-out queue; (b) associating a number with each specific event object in the queue, the number indicating the number of nodes in the set currently accessing the specific event object; and (c) decrementing the number associated in step (b) with each event object by one each time a node finishes access to that event object, such that, when the number is zero for an event object, and the event object is at the head of the queue, that object has been accessed for all nodes requiring access, and may be removed from the queue. In some preferred embodiments each event object comprises a reference to the next event object in the queue. In other embodiments each event object comprises a reference to the next event to be processed by a node processing a current event object. In yet other embodiments there is a second reference number associated with each event object, initially indicating the number of nodes to access the event object, the number decremented as each node accesses the event object.

In embodiments of the invention taught in enabling detail below, for the first time a data structure and system is provided that is capable of using a single queue for providing rout changes to a set of nodes and routers having interest in the changes.

BRIEF DESCRIPTION OF THE DRAWING FIGURES

FIGS. 1A, 1B and 1C are block diagrams showing basic architecture of a scalable router according to an embodiment of the invention;

FIG. 2 schematically represents exchange of route data generated by different routing protocols, according to an embodiment of the invention.

FIG. 3 schematically represents exchange of route data generated by two different routing protocols showing four servers and two clients, according to an embodiment of the invention.

FIG. 4 schematically represents chronology of RTM-mediated data flow between two control cards, according to one embodiment of the invention.

FIG. 5 schematically represents a hierarchical relationship of RTM tasks according to a preferred embodiment of the invention.

FIG. 6 schematically represents a hierarchical relationship between route table manager tasks, according to one embodiment of the invention;

FIG. 7A schematically represents the distribution of route data from a route table manager Level-1 task primary server to a route table manager Level-2 task client, according to the invention;

FIG. 7B schematically represents the distribution of route data from a route table manager Level-1 task secondary server to a route table manager Level-2 task client, according to an embodiment of the invention; and FIG. 8 schematically represents a series of steps involved in a method for synchronized distribution of routing data within a distributed processor router, according to another embodiment of the invention.

DESCRIPTION OF THE PREFERRED EMBODIMENTS

Figure 1A:
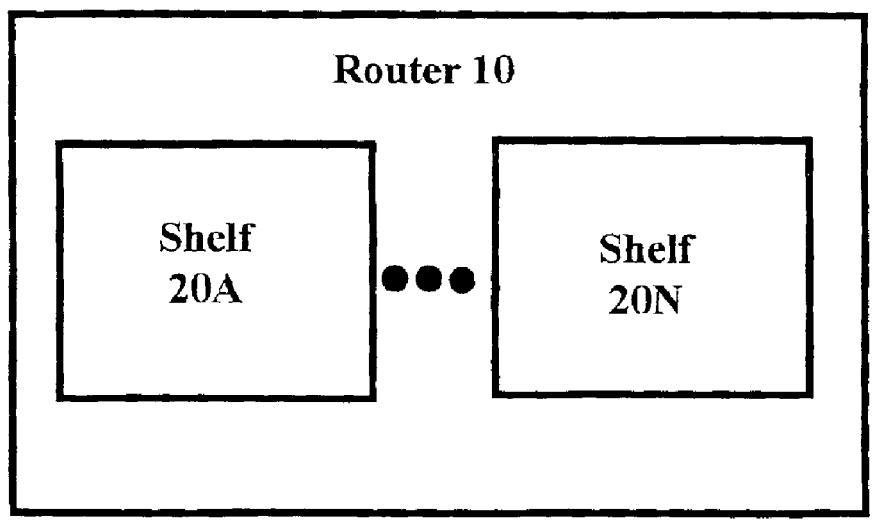
Figure 1B:
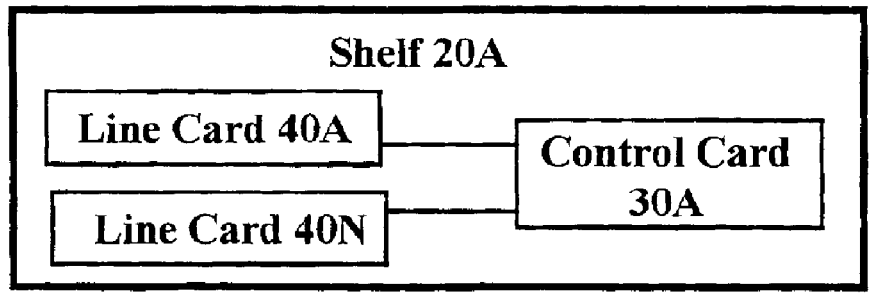
Figure 1B:
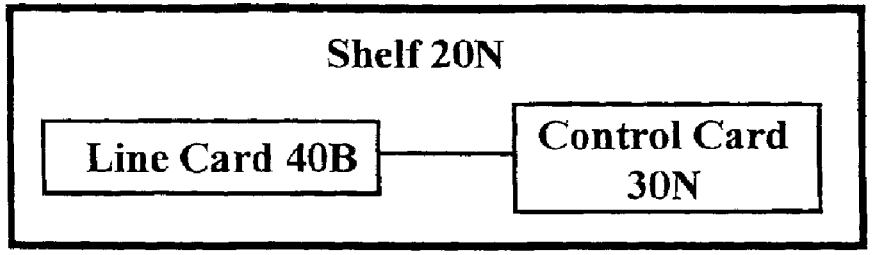
Figure 1C:
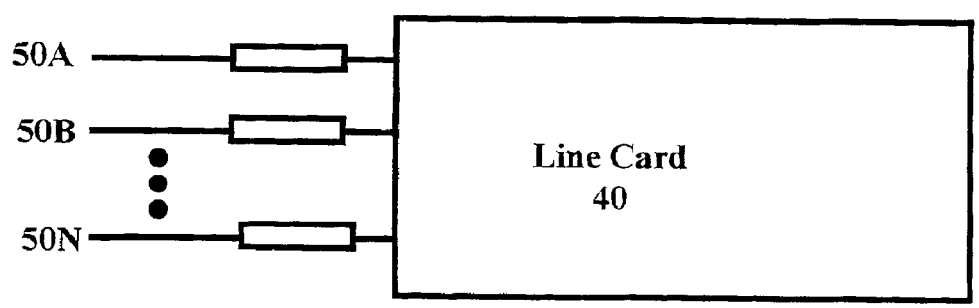

In order to place the invention in perspective for the better understanding thereof, there now follows, with reference to FIGS. 1A–1C, a brief description of a scalable router which may be used in conjunction with the instant invention. FIG. 1A is a block diagram showing the basic architecture of a router 10. Each router 10 may include a plurality of shelves, represented in FIG. 1A as 20A to 20N. As shown in FIG. 1B, each shelf 20 can include a plurality of line cards, represented as 40A to 40N. For the purpose of clarity, only two control cards are shown in FIG. 1B; however, it is to be understood that in practice larger numbers of control cards can be used according to the invention. Each control card 30 is in communication with at least one line card 40. For example, control card 30A is shown as being in communication with line cards 40A and 40N on shelf 20A. Again, for the purpose of clarity, only two line cards are shown as being in communication with control card 30A. However, according to the invention, larger numbers of line cards may be connected to each control card.

FIG. 1C shows line card 40, which could be any of the line cards from a shelf of router 10. Line card 40 has a plurality of ports, or exterior interfaces, 50A, 50B, through 50N connected thereto. Although, only three interfaces are depicted in FIG. 1C, it is to be understood that a much larger number of interfaces may be used in practice.

Introduction to a Route Table Manager

A route table manager (RTM) of the instant invention is a multifaceted software suite having a plurality of functions (tasks) that include, but are not necessarily limited to, the following:

1. messaging between RTM task servers and RTM task clients to form scalable and fault tolerant distribution topologies;
2. managing exchange of database information between RTM tasks running on separate processors within a distributed processor environment;
3. constructing a routing database from the sum of database information a) generated locally by tasks running on a local processor, and b) generated by and received from tasks running on at least one remote processor;
4. constructing a forwarding database from the routing database; and
5. propagating the forwarding database from RTM tasks having a higher hierarchical level (Level-1 tasks) to RTM tasks having a lower hierarchical level (Level-2 and lower-level tasks).

In a distributed multi-processor router, such as is encountered according to certain aspects of the instant invention, the RTM distributes information on dynamic routes, static routes, and interface information, hereafter referred to as database information. In return, RTM relies on a number of tasks (services) for database information updates. Such tasks include those of dynamic routing protocols, IP, and an interface manager task. Routing protocols provide the RTM with updates on dynamic routes. IP tasks provide the RTM with updates on static routes. The interface manager task manages the ports, or external interfaces, of the router system, and provides the RTM with interface information. Interface information relates to a specific interface from which to dispatch a particular packet. Interface information, in general, is well known in the art.

The sum of the database information provided by services is collectively referred to as the routing database. Route entries maintained in the routing database include best and non-best routes. For example, all route entries that were injected by different routing protocols of the system's complement of routing protocols are stored in the routing database. However, for a plurality of entries having the same destination prefix, only one of the entries is deemed the best. The decision as to which of those is the best entry (i.e. the best route for forwarding a packet) is based on a pre-configured preference value assigned to each routing protocol. For example, if static routes have a high preference value and IS—IS routes have a low preference value, and a route entry having the same destination prefix was injected by each protocol, although both entries will remain in the routing database, the static route is considered to be the best route. In embodiments of the invention, both the best routes and the non-best routes, as well as interface information, are retained in the routing database. A subset of the routing database exists which is referred to as the forwarding table. The forwarding table contains all route entries that are deemed the best plus all interface information. Therefore, according to the invention, both the best routes and the interface information define the forwarding table.

A task of the RTM software suite typically runs on each of the plurality of processors of a multi-processor scalable system, including processors on control cards and line cards. The RTM task executing on each processor can be classified as either a Level-1 RTM task (L1) or a Level-2 RTM task (L2), and the processor may be termed an L1 or an L2 as a result. The distinction between an L1 and an L2 is in general the presence of either a routing database or a forwarding table. An L1 RTM task maintains the routing database and an L2 RTM task maintains the forwarding table. A subset of the plurality of processors of the system is statically configured to host an L1 RTM task and is referred to as the L1 pool. All other processors of the system outside of the L1 pool host an L2 RTM task.

As previously described, the RTM depends on a number of services for updates in routing information. A processor within the L1 pool may be running a number of such services, or none at all. Examples of such services include the IP routing protocols, OSPF, BGP, integrated ISIS, etc. (See, for example, C. Huitema, *Routing in the Internet*, $2^{nd}$ Edition, Prentice Hall PTR, 2000.) According to the invention, each L1 is responsible for constructing a routing database from information generated in part by the local service(s), and in part from information generated by services running in association with other L1s. To obtain information that is generated by non-local services, i.e. information generated by services running on other L1s, an L1 must register with at least one other L1 where the service is running. According to the invention, in order to efficiently exchange locally generated information between L1s, each L1 can register with at least one other L1 as needed, on a per-service basis, to receive updates on the full complement of route data which is generated non-locally.

L1s register with each other for distribution of the following types of database information: dynamic routes including best and non-best routes, static routes including best and non-best routes, and interface information. An L1 is classified as an L1 server or L1 client for a given type of database information, depending on the existence of local services. An L1 task is an L1 server for a particular type of database information if the service which generates that information is running locally. An L1 task is an L1 client for a particular type of database information if the service which generates that information is not running locally and the L1 task has registered with an L1 server for information of this type. For example, if a BGP task was running on a given processor, the L1 task on that processor is considered an L1 server for BGP route information. If the same L1 task has registered with a remote L1 task for OSPF route information, the former L1 task is considered an L1 client of the remote L1 task with regard to OSPF route information.

Figure 2:
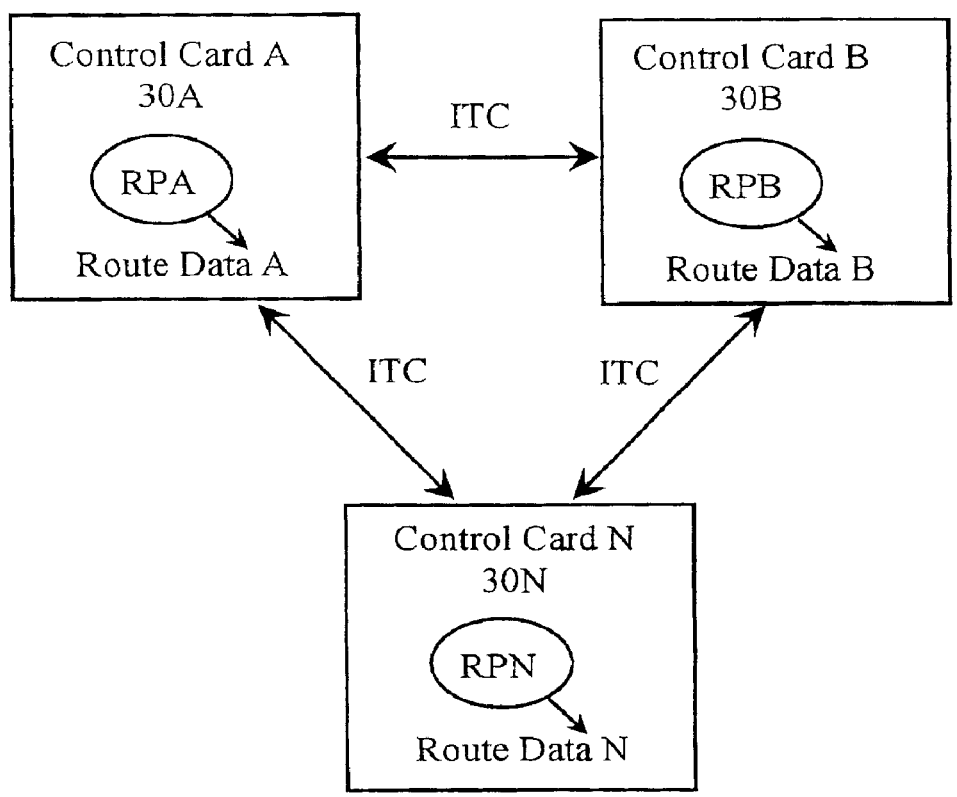

FIG. 2 schematically represents exchange of route data, generated by different routing protocols, between a plurality of control cards 30A, 30B, and 30N within a distributed processor, scalable router, according to one embodiment of the invention. As alluded to hereinabove, the inventors have determined that superior performance from a scalable router is attained when routing protocols are distributed among control cards of the router. That is, superior performance is attained by running a plurality of different routing protocols on a plurality of processors within the control plane (on control cards) within the router. According to one embodiment, each of the plurality of processors is situated on a different control card of the router. With reference to FIG. 2, the plurality of control cards is represented by control cards 30A, 30B, and 30N. In the example shown in FIG. 2 a service or routing protocol task runs on each control card 30A, 30B, 30N. Therefore, according to the definitions presented hereinabove, a Level-1 task (L1) of the RTM is running on each processor. In particular, according to the example shown in FIG. 2, control cards 30A, 30B, 30N run routing protocol A, routing protocol B, and routing protocol N, respectively. Routing protocol A, routing protocol B, and routing protocol N, provide route data A, route data B, and route data N, respectively. As described hereinabove, the L1 for each control card requires route data from the full complement of routing protocols running on the plurality of control cards 30A, 30B, and 30N. L1s therefore exchange route data by registering with other L1s on a per-service basis.

Figure 3:
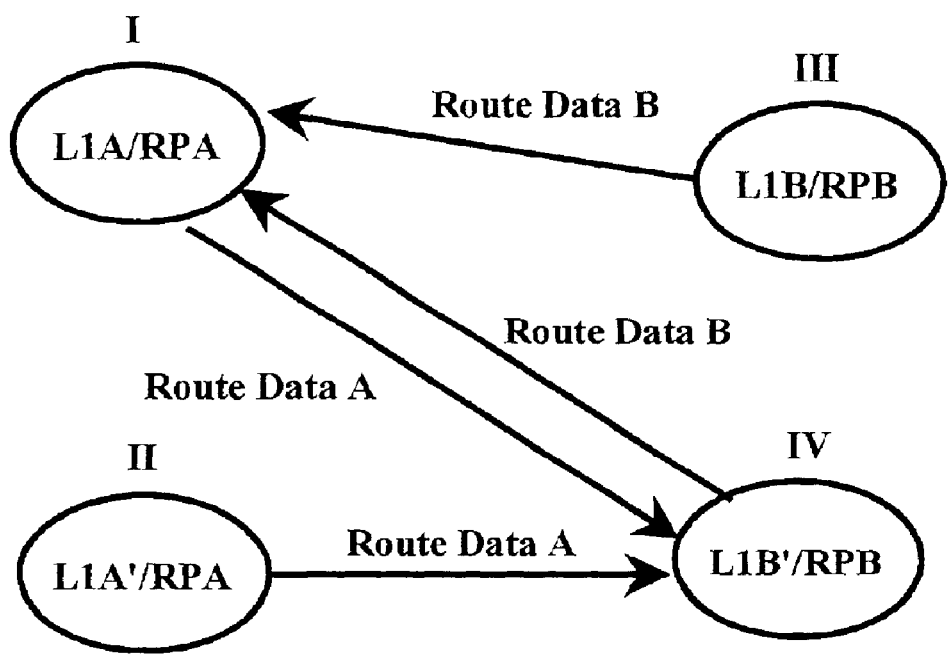

FIG. 3 schematically represents exchange of route data generated by two different routing protocols showing four servers and two clients, according to an embodiment of the invention. This aspect of the instant invention relates to the registration of L1s with at least one other L1, on a per-service basis, for the facile exchange of non-locally generated route data. Each entity I–IV represents an L1 task: L1A, L1A', L1B, and L1B', respectively. For the purpose of this example, the routing protocol tasks are designated as routing protocol A (RPA) in the case of L1A and L1A', and routing protocol B (RPB) in the case of L1B and L1B'. Under the control of the RTM, L1A registers as a client with both L1B and L1B' for information generated by routing protocol B, wherein both L1B and L1B' are servers. Similarly, L1B' registers as a client with both L1A and L1A' for information generated by routing protocol A, wherein both L1A and L1A' are servers. Thus, the same entity may have both client and server functionality concurrently. For the sake of clarity, L1A' and L1B are not shown as clients, but as servers only, therefore sending, rather than receiving information.

In the arrangement shown in FIG. 3 L1A is registered with both L1B and L1B', which both run RPB, and L1B' is registered with both L1A and L1A', which both run RPA. This redundancy in preferred embodiments of the invention provides fault tolerance against the probability of failure of one or more L1 servers. Fault tolerance in the system is further described in a section below entitled Fault Tolerance.

Figure 4:
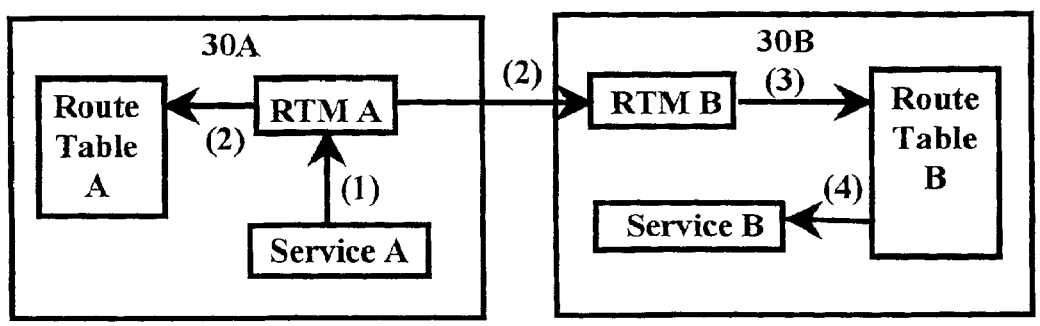

FIG. 4 schematically represents the chronology of RTM-mediated data flow between control cards 30A and 30B of router 10, according to one embodiment of the invention. Only two control cards are depicted in FIG. 4, however it is to be understood that the principles of data flow could also apply to a larger number of control cards. Control cards 30A and 30B run services A and B, respectively. Each control card 30A and 30B also has an RTM task running, RTM A, RTM B, respectively. The fact of each of the processors running a service task dictates that RTM A and RTM B are both Level-1 as defined hereinabove. Data flow is initiated by information injection from service A to RTM A, as indicated by arrow 1. From RTM A, information is distributed concurrently to both route table A and to RTM B, as indicated by the two arrows each labeled 2. Thereafter, information is distributed from RTM B to route table B, as indicated by arrow 3. Finally, information is received by Service B from route table B, arrow 4. Data flow of the type illustrated in FIG. 4 enables the timely distribution of routing database updates between a plurality of control cards within a distributed processor router, in which the plurality of control cards are jointly responsible for running a plurality of different services.

By registration among L1s in the manner described herein, information generated by the full complement of services of the system can be effectively exchanged between L1s, with the result that each L1 maintains a synchronized routing database. Scalability of the distribution of database information among L1s is achieved by the formation of distribution trees during the registration process.

According to the invention, each L1 task will maintain a synchronized copy of the routing database. Each L1 task has the role of constructing a synchronized forwarding table for use by L2 tasks, wherein the forwarding table consists of a subset of the routing database. Specifically, the routing database consists of all route entries, both best and non-best as defined above, as well as interface information. Each L1 is able to construct the forwarding table, based on the routing database, by identifying the best route for each destination prefix.

In this manner, when a best route is deleted from the routing database, each L1 can immediately replace the deleted "best route" with the next best route in the forwarding table which matches the particular destination prefix.

An L2 task is an RTM task which is running on a processor outside of the L1 pool. Each L2 requires a copy of the forwarding table. The source for forwarding table information are L1 tasks that are running throughout the system.

Figure 5:
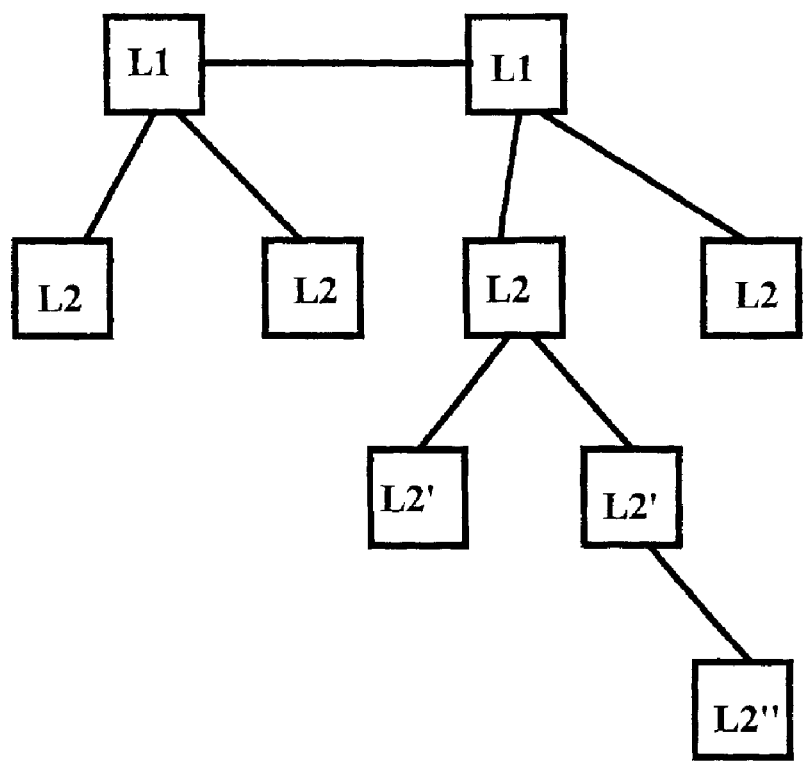

The hierarchical relationship of RTM tasks, according to a preferred embodiment of the invention, is schematically represented in FIG. 5. L1s represent the highest level, or top layer, of the hierarchical relationship. As described above, L1s are Level-1 RTM tasks which maintain a synchronized copy of the routing database and are the source of the forwarding table, whereas L2s are Level-2 RTM tasks which only maintain a copy of the forwarding table. L2s themselves can occupy different hierarchical levels. In order to distinguish between L2s which occupy different hierarchical levels, L2 nodes which are clients of L1 servers as well as servers of L2 clients may be designated L2's; while L2s which are clients of L2' nodes may be designated L2"s. Thus, immediately below the L1 s, at the intermediate hierarchical level or layer, lie L2s that are registered with L1s for forwarding table information. Below the intermediate hierarchical level lie L2's which are registered with an L2 node. Further, L2"s may be registered with L2's. According to a preferred embodiment, the depth of the topology shown in FIG. 5 is kept low by having a large fan-out at Layer 1. Again with reference to FIG. 5, it should be noted that although only a single server is shown for each client, according to a currently preferred embodiment of the invention designed for fault tolerance, i.e. tolerance of the router system to failure of a RTM task server, each client has at least two servers. In practice, for a given L2" client (Layer 4), one server can be a Layer 1 server (L1), and the other can be a Layer 2 node.

According to the invention, communication between RTM task clients and RTM task servers takes place to form scalable and fault tolerant distribution topologies. Among L1 tasks, distribution trees are formed for the propagation of routing database information. An L1 task which is running in association with a given service has the role of sourcing routing database information generated by that service. Distinct distribution trees therefore exist per service for the exchange of routing database information among L1 tasks. In a similar manner, distribution trees for the propagation of the forwarding table are formed with L1 tasks as the source of forwarding table information and L2 tasks as the nodes and leaves.

The RTM interacts with a Location Service module to determine the location of all RTM tasks running within router system 10. That is, the Location Service (LS) functions as a directory service. Interactions of the RTM with the LS include: (1) L1 RTM tasks, running on a control card 30, query the LS to determine the location of any RTM tasks acting as the source of routing database information for a particular service; (2) L2 RTM tasks query the LS to determine the location of any L1 RTM tasks (sources of forwarding table information); (3) LS notifies the RTM in the event that an RTM task comes up or goes down and (4) RTM tasks provide LS with RTM task type (including the routing database source) and level information to answer queries described in (1) through (3).

Figure 6:
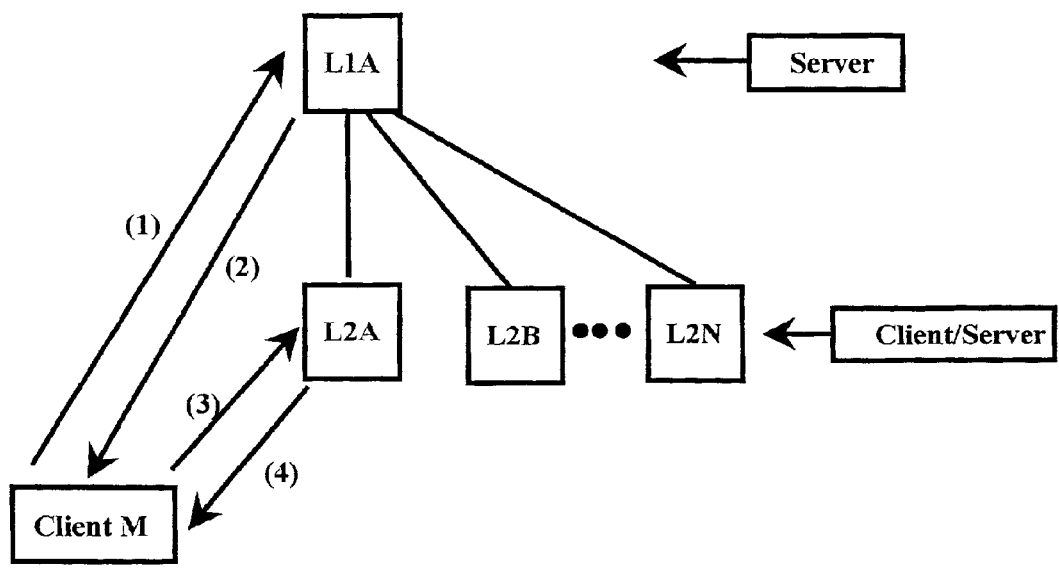

As described above, L1s are responsible for propagating the forwarding database to the Level-2 tasks (L2s). This is accomplished by the establishment of L1–L2 client-server relationships. L2 nodes register with L1s for the forwarding table only (i.e., L2 nodes register for the forwarding table "service"). According to one aspect of the invention, an L1 server will accept N L2 clients, where N is determined, at least in part, by the configured maximum fan-out. This situation is schematically represented in FIG. 6, in which an L1 server (L1A) already has N L2 clients, represented by L2A, L2B, and up to L2N. Client M represents an L2 that is not a client of an RTM task running in the control plane of the router system. If client M then signals a request to register with L1A (arrow 1), that request is denied as represented by arrow 2. If maximum fan-out has been reached on all L1s in the control plane, client M then requests registration (arrow 3) with an L2, e.g. L2A, that is a client of an L1 (in this case L1A). A registration response message is then sent from L2A to client M, as represented by arrow 4. Client M can now receive forwarding table updates from L1A via L2A. Maximum fan-out in L1–L2 client-server relationships is determined, inter alia, by CPU load. In case maximum fan-out of all L2 servers has been reached, then a client can force registration. This client-server registration procedure is used to form distribution trees for the propagation of the forwarding database among all L2 clients. Information on the location of the servers is available from the LS. According to a currently preferred embodiment, the LS itself runs on all control cards 30 and line cards 40 of router system 10.

It will be apparent to the skilled artisan that the client-server registration procedure described here is hierarchically based, in that L2s first attempt to register with L1s until maximum fan-out has been reached, and only then will an L2 attempt to register with an L2 that is registered as a client of an L1. An L2 which acts as a server to an L2 client may be designated L2', and an L2 client of an L2' server may be designated L2" (FIG. 5). Large scale distribution is therefore achieved by using a reliable multicast transmission at the tree nodes. In general, the number of L2s is greater than the number of L1s. According to one embodiment, the ratio of L1s to L2s ranges from about 1:1 to about 1:15.

Fault Tolerance

Fault tolerance in the system of the invention, as alluded to briefly above, is achieved by redundancy in registration, and therefore in communication. As a client, an L1 or L2 task registers with at least two servers from which it may receive the same information. One of the servers with which the client registers is considered a primary server, and the other a secondary. The client communicates exclusively with the primary unless and until the primary fails in some manner to deliver, and then the client turns to the secondary for database updates. Service is thus uninterrupted.

In the event of a server failure, and a necessary switchover by a client to its secondary server, the client receives a copy of the secondary server's database. If the client is a node in a distribution tree, it simply delivers to its clients the difference between the existing database and the copy of the database received from the secondary server.

Figure 7A:
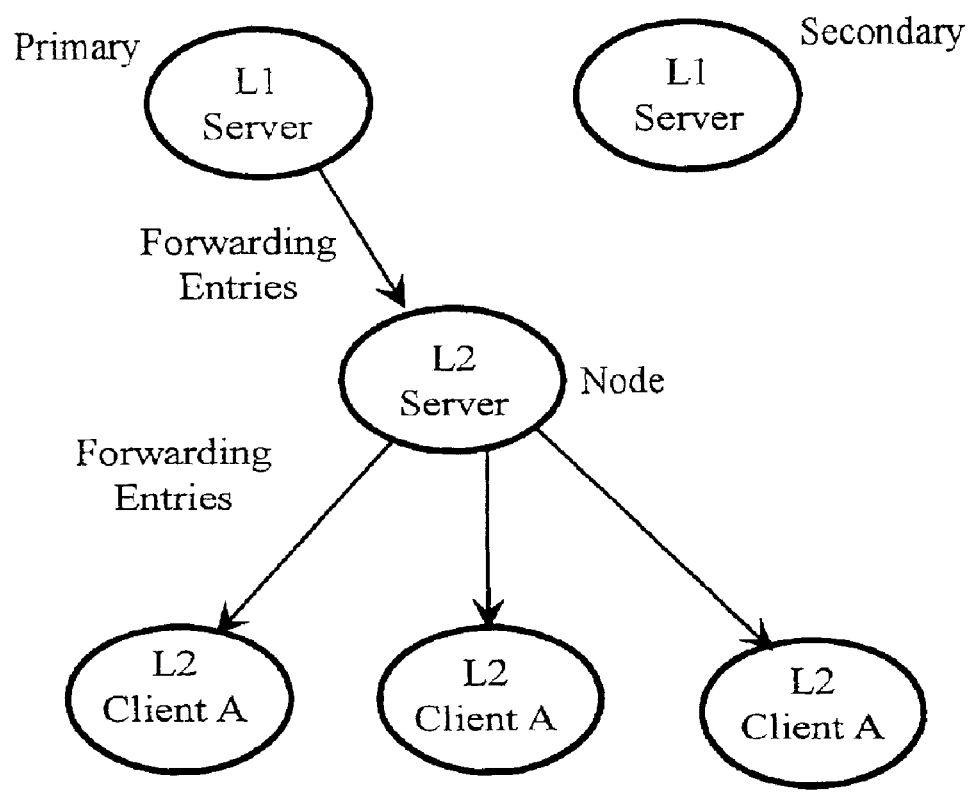

Referring now to FIG. 7A, the role of a control card as a Level-2 node is to receive forwarding entries from its primary L1 server, and then to redistribute the forwarding entries to its own clients, represented as L2 clients A, B, and C. The L2 node is registered with two L1 servers, the primary L1 server and the secondary L1 server, for the purpose of fault tolerance, as schematically represented in FIG. 7A.

Figure 7B:
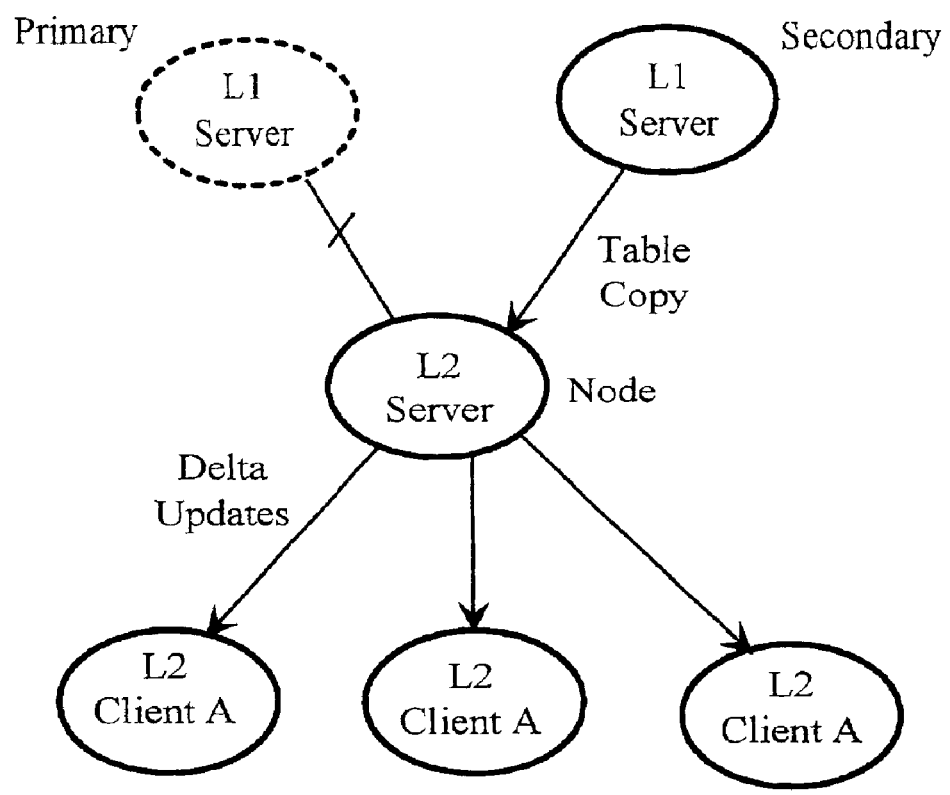

Referring now to FIG. 7B, if the primary L1 server fails, the L2 node activates its secondary L1 server. When the secondary L1 server is activated, it delivers a complete copy of its database to the L2 node, as schematically represented in FIG. 7B. When the L2 node receives the copy of the entire table from the secondary L1 server, it compares that copy to its existing database, and calculates the difference between the two. It only needs to distribute to L2 clients A, B and C the difference between the entire new table and its existing table.

Figure 8:
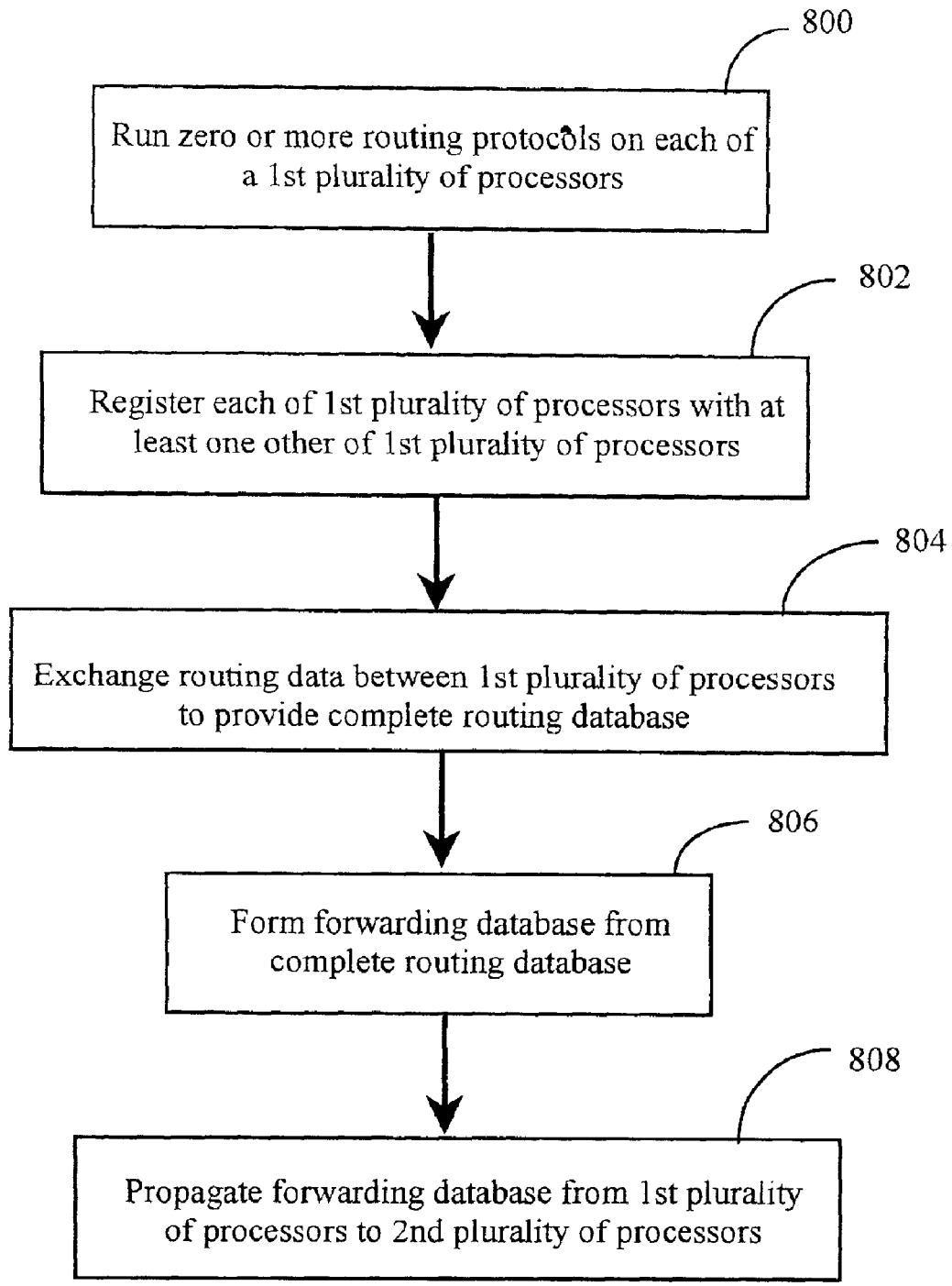

FIG. 8 schematically represents a series of steps in a method for the synchronized distribution of routing data within a distributed processor, highly-scalable router, according to one embodiment of the invention. Step 800 of FIG. 8 involves running at least one routing protocol of a complement of routing protocols on individual ones of a first plurality of processors, wherein each routing protocol of the complement of routing protocols generates routing data. This first plurality of processors are the L1 processors described in detail above. Also as previously described, it is the configuration of the L1s to run routing protocols and to otherwise behave as L1s that makes them L1s. An L1 may not be running a routing protocol, but still be an L1. That is, an L1 may obtain all of its routing data from other L1s with which it registers as a client.

Step 802 involves registering each of the first plurality of processors with at least one other of the first plurality of processors. Step 804 involves exchanging the routing data between members of the first plurality of processors, such that each of the first plurality of processors receives a full complement of routing data generated by the complement of routing protocols. The complement of routing data received by each of the first plurality of processors provides a complete routing database. Step 806 involves forming a forwarding database from the complete routing database provided as a result of step 804. The forwarding database formed in step 806 is comprised of a subset of the complete routing database provided in step 804.

Step 808 involves propagating the forwarding database from the first plurality of processors to a second plurality of processors of the distributed processor router, wherein the second plurality of processors are characterized as not running (or being configured to run) routing protocols. The method steps 800 through 808 may be sequentially repeated over time, for example, when updated reachability information is received from one or more peer routers of the distributed processor router.

General Applicability

The embodiments of the present invention described in enabling detail above have all been related to routing of data packets in multiprocessor, scalable routers. These embodiments are exemplary, and represent a preferred application of the new technology described, but are not limiting in applicability of the invention. There are numerous other situations and systems in which the apparatus and methods of the invention may provide advantages. These situations include all situations in which multiple processors may be employed in parallel processing applications, wherein maintenance of one or more common databases is the object.

Virtual Outbound Change-Notification List

In one aspect of the present invention, the inventors provide a prioritized virtual output queue for multiple peer processing of changes and deletions to routing tables advertised over a network. This virtual output queue list is an application of a unique data structure developed by the inventors, and termed a Virtual Change Notification List, (VCN) which is described below, after which an application of the data structure for propagating changes in routing information bases is described in more detail.

1. Introduction

Figure 13:
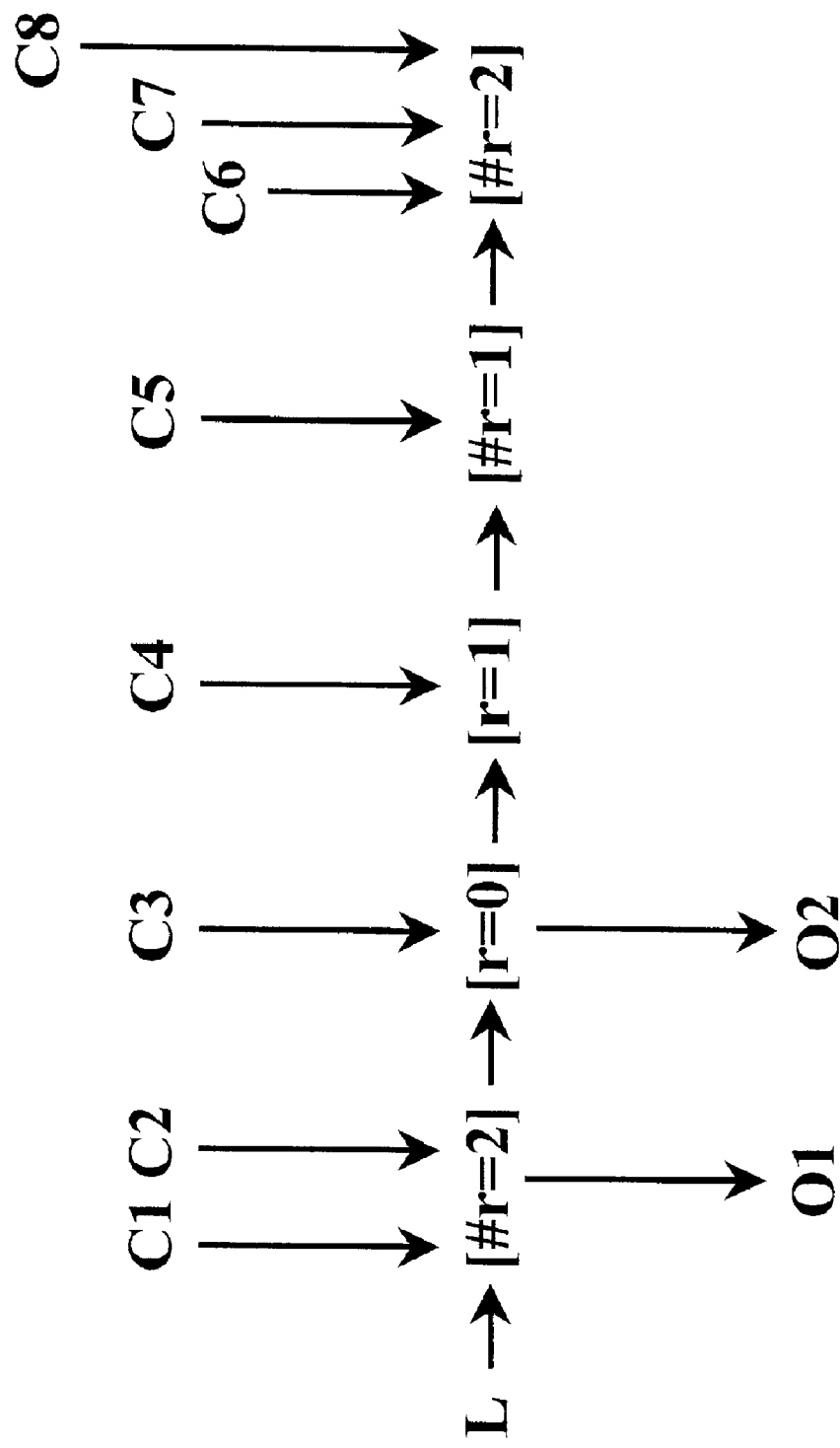
FIG. 13 is a diagram of a Virtual Change List according to an embodiment of the present invention.

FIG. 13 is a diagram of a data structure termed a VCN by the inventors, according to a preferred embodiment of the present invention.

The Virtual Change Notification List (VCN) is a data structure and method by which state changes for objects may be disseminated to a large number of consumers while keeping memory usage bounded. The VCN can be viewed as a multi-consumer bounded event queue.

In conventional structure and terminology a state change for an object is considered an event applying to a particular object. Each event may be queued into a list. Traditionally, such a system is viewed as a simple producer-consumer model. Each time an object changes, an event is generated and queued. A consumer then processes these events in a FIFO order.

The model just described suffers from at least two problems: (1) the queue is unbounded, i.e., if the object state changes faster than the consumer can process the events list, the list will grow without bounds, and (2) each consumer has its own list, so for N consumers there will be N such lists. To treat these difficulties a data structure is described here which removes these problems.

In particular, the new invention, described below, achieves the following results:

(1) there is a single event list for any number of consumers
(2) given N consumers and M objects which can change state, the event list is bounded and contains at most (N+M) events.

It is worth noting that even though there is a single list shared by all consumers, each consumer processes the event list independently from the other consumers. Each consumer can process the list at its own pace. This is especially interesting in a distributed environment where fast consumers should not be held back by slow consumers.

2. Main Objects and Data Structure

The VCN data structure comprises three types of objects: (1) events, (2) a list of events, and (3) consumers.

Each object has attributes, some of which are described below event (E):
 next: reference to next event object in the list
 r: number of consumer objects that are referencing this event
 mark or flag indicating whether it is a real event or a shadow event
 application-specific information associated with this object event list (L):
 references to first and last event in the list consumer (C):
 e: reference to the next event to be processed by this consumer FIG. 13 illustrates the VCN data structure in a preferred embodiment of the present invention. In this example there are 8 consumers of the event list, numbered C1 through C8. Two objects (O1, O2) have changed their state. so each has an event associated with that object in the event list. There are, in addition, three shadow events (marked with #), whose purpose is to provide a valid event to which the consumers can refer, A shadow event is not a true event, but a marker to ease processing. In some cases, because events change while the queue is being accessed by peers, the use of a shadow event simplifies processing.

Each event object keeps a reference count indicating how many consumers are currently configured to refer to that object. Events are removed from the list either directly by the producer, or indirectly when all consumers have processed (assimilated) them. In the latter case, the event at the head of the list is automatically removed after the last consumer has processed it (this is indicated by its reference count reaching 0).

C1 and C2 are at the beginning of the list and have not yet processed any event. C3, C4 and C5 are processing the list. C6, C7 and C8 are at the end of the list. Because there are no more real events to process, they are waiting on a shadow event until new events are added to the list.

3. Functionality

The principle functions used to maintain and use this data structure are as follows:

Init-List(L): this function initializes the event list
Add-Event(E,L): an object has changed state, so the producer adds a new event for it in the event list
Change-Event(E,L): the producer indicates that an object has changed state again and there is already an event for it in the list.
Delete-Event(E,L): the state change for an object need not be advertised to consumers any longer. The producer therefore deletes the associated event from the event list.
Add-Consumer(C,L): there is a new consumer interested in the event list. Add it.
Delete-Consumer(C,L): removes an existing consumer from the event list
Consume-Event(C,L): a consumer processes one event in the list The pseudo-code for these functions is as follows:
Init-List(L)
1 initialize list L to empty
Add-Event(E,L)

```
1 Append E to L
Change-Event(E,L)
1 if (E.r>0) then
2 create new event E' for same object associated with E.
3 append E' to L
4 mark E as a shadow event
5 else
6 move E at the end of the L
Delete-Event(E,L)
1 if (E.r>0) then
2 mark E as shadow event
3 else
4 remove E from L
Increment-RefCount(E)
1 E.r<-E.r+1
Decrement-RefCount(E,L)
1 E.r<-E.r-1
2 if (E.r=0) AND ((E is a shadow) OR (E is at beginning of
    L)) then
3 remove E from L
Add-Consumer(C,L)
1 if (L is empty)
2 create shadow event E, append it to L
3 find E, the event at the beginning of the list L
4 C.e<-E
5 Increment-RefCount(E)
Move-Consumer-To-Next-Event(C,L)
1 E<-C.e
2 E'<-E.next
3 Decrement-RefCount(E,L)
4 C.e<-E'
5 Increment-RefCount(E',L)
Delete-Consumer(C,L)
1 E<-C.e
2 if (E is at the end OR not at the beginning of L) OR (E.r>1)
    then
3 Decrement-RefCount(E,L)
4 else
5 do
6 Move-Consumer-To-Next-Event(C,L)
7 E<-C.e
8 while (E.r==1 AND E is not at the end of L)
9 Decrement-RefCount(E,L)
Consume-Event(C,L)
1 E<-C.e
2 if (E is not a shadow event) then
3 if (E is at the end of L) then
4 create shadow event E'
5 append E' to end of the list
6 process E
7 else
8 if (E is at the end of L) then
9 return
10 Move-Consumer-To-Next-Event(C,L)
```

FIGS. 9 through 12 illustrate an application of the above described VCN, wherein the data structure and method is used for advertising route changes to peers in a data packet network.

Figure 9:
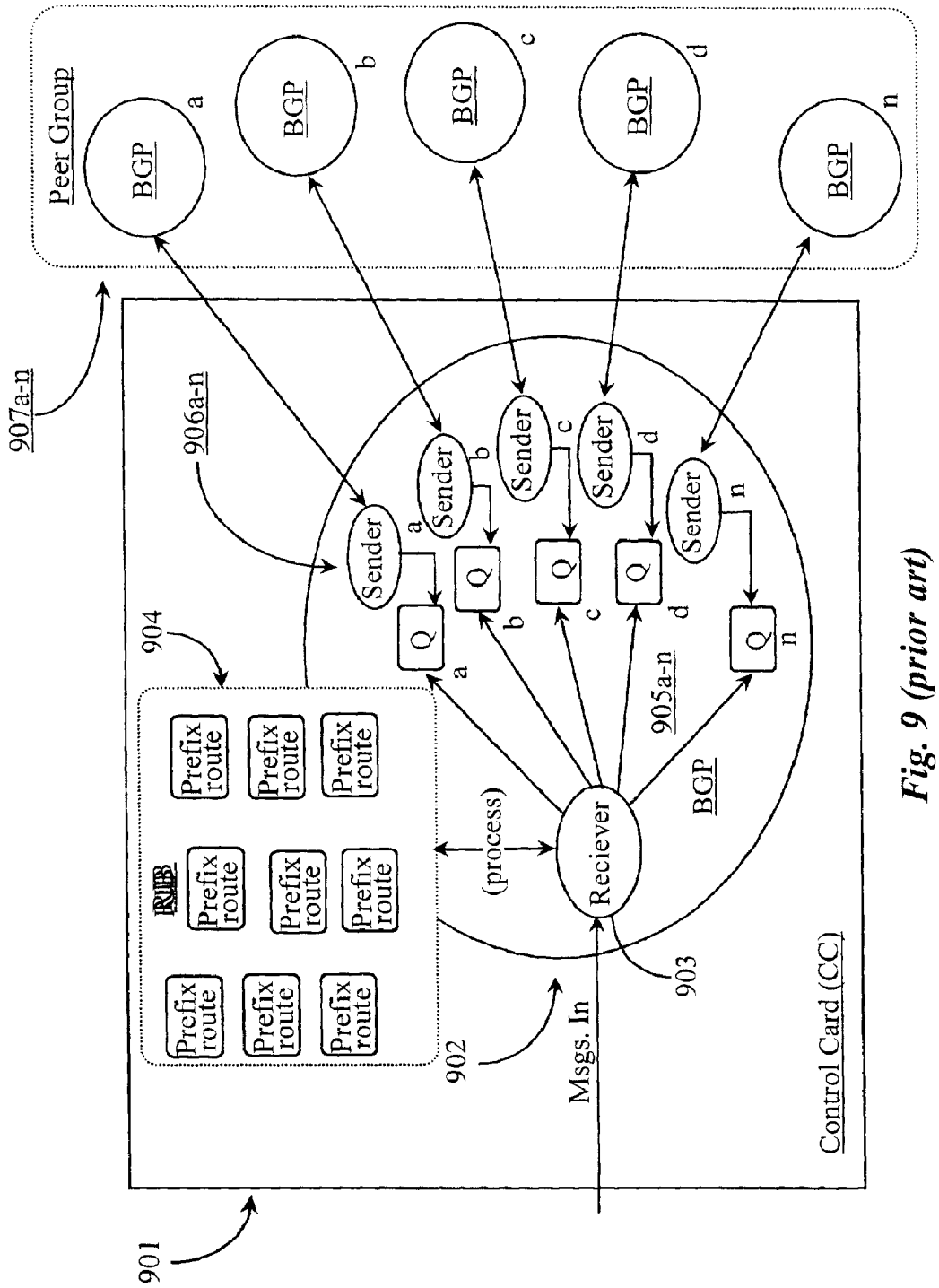
FIG. 9 is a block-diagram illustrating outbound peer processing of route change notifications according to prior art.

FIG. 9 is a block diagram illustrating propagation of outbound change notifications to peers according to prior art. In a distributed-processor router as known to the inventors, line, control, and fabric processors are distributed within the router and interconnected by communication paths to provide the essential functions and control mechanisms for data packet routing. A control card (which can be one or more of many implemented within the router) of such a router is responsible for distributing link state, port configuration, boot instructions, and other required data to enable subjugate line and fabric cards under its sphere of influence to synchronize in the routing of data from ingress to egress of the router In a distributed-processor router known to the inventors, also known to the inventors as a Terra-bit Network-Router (TNR), it is the control card that propagates changes in routing information to peers. This example of technology existing prior to the present invention (but not necessarily prior art) will focus for exemplary purposes on Border Gateway Protocol (BGP) and therefore route change notification to BGP peers. It is duly noted herein that the method and system is equally applicable to single-processor routers and to other protocols than BGP.

In this example, a single Control Card (CC) 901 is illustrated. CC 901 comprises all of the components and software required to manage data packet routing within a host router. CC 901, in an embodiment of a single-processor router, may be thought of or likened to a single processor responsible for routing control and capability. In BGP route change notification, changes occurring to routing tables are propagated among peers so that all peers have the latest routing information in their routing tables. As described in the background section of this specification, NLRI changes are processed and propagated on an ongoing basis between peers operating in any given network topology. BGP synchronization in this regard enables every peer to have updated routing tables without requiring propagation of an entire table. Of course, when a peer router first comes on-line, it must receive the entire routing table that is currently active. After boot and recognition by peers and receipt of the master routing table, only changes to the table need be propagated.

CC 901 in this example has BGP software suite 902 described in this example as a BGP module executable thereon, and adapted to control routing according to BGP rules. BGP module 902 has a BGP receiver module 903 adapted to receive change notifications from other BGP peers. BGP module 902 has access to a main routing information base (RIB) 904, which is adapted to contain all of the routing information for a given topology for which the router using CC 901 is a part. RIB 904 has a plurality of network prefix/route entries illustrated therein and labeled Prefix route. These represent NLRI (Prefix) and associated NLRE (route). It will be understood by one with skill in the art that a single NLRI identified as a Prefix may have multiple NLRE (routes) associated therewith. In this simple example only 9 NLRIs labeled Prefix Route are illustrated, however it will be appreciated that there will be many more listed in a routing information base such as RIB 904.

BGP module 902 has multiple queues (Q) 905*a–n* illustrated therein and adapted to manage queued messages signifying changed or deleted NLRIs. Each queue 905*a–n* is a first-in-first-out (FIFO) queue whose individual capacities for holding data are bound by the total number of possible entries in the queue structure. Each active queue 905*a–n* represents an outbound change notification queue associated specifically with a single connected and active peer. A peer group comprising BGP peers 907*a–n* is illustrated externally to CC 901. BGP peers 907*a–n* as a group represent the number of neighboring BGP-enabled peers immediately reachable by CC 901. As such, each included peer is labeled a BGP peer and may be assumed equivalent to the router employing CC 901 with BGP module 902, at least with respect to overall function. There may, of course, be significant differences.

Queues 905*a–n* each have sender modules 906*a–n* associated therewith, one per queue. Each connected peer 907a–n has an individual sender and queue represented within BGP module 902. It will be appreciated by one with skill in the art that the number of connected peers 907a–n may be larger or smaller than the number illustrated in this example, as well as that any current number of connected peers is subject to addition and subtraction during active network routing. Similarly then, the number of representative queues and senders within BGP module 902 may likewise be adjusted accordingly to the number of connected peers. It is also noted in this example of a distributed-processor router, that BGP peers 907a–n may include BGP modules in separate routers as well as BGP modules provided on other control cards within a same router.

A directional arrow labeled Msgs In (for messages in) is illustrated from a source or sources external from CC 901 into receiver 903 of BGP module 902. Msgs in represent change notifications propagated to BGP module 902 from other BGP peers. Receiver 903 processes each received message against RIB 904 and updates RIB 904 if necessary. For example, if an NLRI is received at receiver 903 wherein the entry does not match an NLRI in RIB 904, BGP module 902 then updates RIB 904 with the new entry if it is valid. Receiver 903 then replicates the message n number of times and places the copied messages into queues 905a–n for outbound message processing and propagation to eligible peers 907a–n. This is illustrated by directional arrows emanating from receiver 903 and progressing into each of queues 905a–n.

Senders 906a–n process their respective queues on a FIFO basis 905a–n on behalf of respective peers 907a–n. Senders 906a–n are logically illustrated as connected for communication (one per peer) to peers 907a–n by bi-directional arrows. When a message reaches the head of any queue 905a–n, a sender 906a–n notifies its appropriate peer that it has a message for processing. Peers 907a–n may then receive their messages and update their copies of RIB 904 before propagating the messages on to other peers if necessary.

There are some problems with this prior-art method of change notification processing and propagation. Firstly, maintaining a plurality of separate outbound queues dedicated to a like number of peers requires substantial circuitry and code to be made available on CC 901, and substantial processing. In a distributed processor router known to the inventors there is a practical limit to how much buffer circuitry can be economically provided. In both single and distributed processor routers, a reduction in required circuitry for buffering outbound peer messages would enable less expensive and more practical implementation. Moreover, because of queue limits being bound only by the total number of routing entries in a main table, much-unused circuitry is typically present.

Each peer sender 906a–n is controlled for sending by an advertisement interval controlled by a timing function (not shown). When the timer fires, the senders propagate messages to peers. This forces peers 907a–n to accept packets only as fast as the BGP module sends them. If a peer (907a–n) gets busy, then there can be packet overflow on the sender's side. To compensate for this potential difficulty, in prior art senders for all peers in a group are slowed down to the rate that the slowest peer in the group can receive the notifications.

Another problem with prior art change notification processing (outbound processing) is that there is no prioritization concerning NLRI with no reachable NLRE versus NLRI that have an updated NLRE state. It is important that NLRIs with no reachable NLRE be withdrawn for all peers as soon as possible. In the view of the inventors this priority should override other change-notification messaging.

Yet another problem with prior-art outbound processing concerns timing. In prior art, the change notifications (NLRIs) are placed into queues 905a–n regardless of advertisement interval. The packets are propagated to peers from the queues at the pre-configured time of the advertisement interval. The present inventors believe it would be more economical to instead process the changed routes at the timing of the advertisement interval and send the packets immediately, so that they do not have to be stored in outbound queues until the timer expires.

The inventors provide a novel solution to the above-stated problems through provision of a virtual change notification list, the data structure and function of which is described in general detail above. A novel implementation of this data structure and method is described in enabling detail below.

Figure 10:
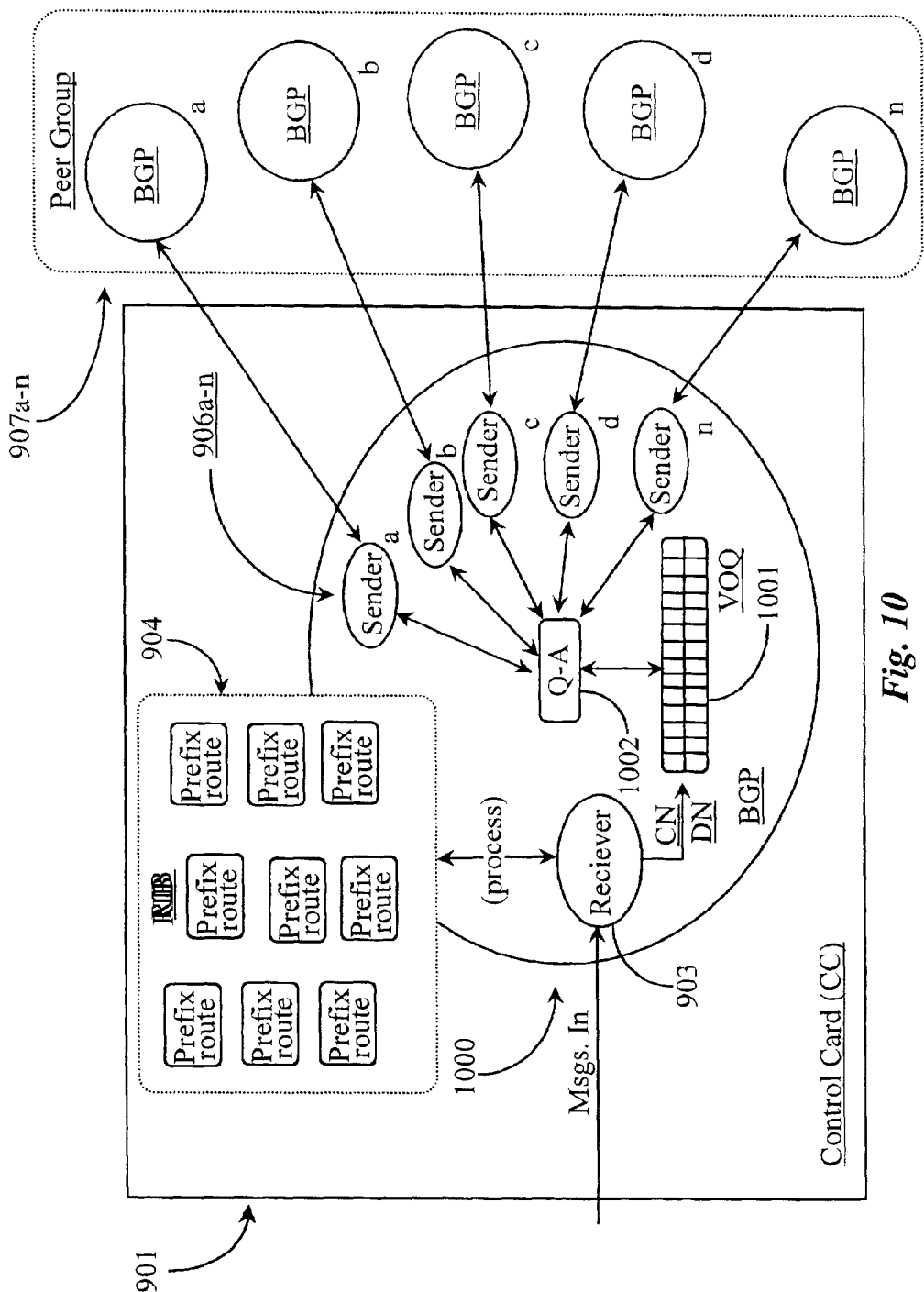
FIG. 10 is a block-diagram illustrating outbound peer processing of route change notifications according to an embodiment of the present invention.

FIG. 10 is a block-diagram illustrating outbound peer processing of route change notifications according to an embodiment of the present invention. Elements described above with reference to FIG. 9 that also appear in this example of a preferred embodiment, retain their element numbers previously assigned, and are not re-introduced unless they are modified according to aspects of the present invention. CC 1003 has a BGP module 1000 provided thereon that has been modified in construction and operating function for practicing the present invention according to a preferred embodiment.

BGP module 1000 does not have multiple outbound queues as described with reference to FIG. 9. Instead, BGP module 1000 has a single virtual outbound queue (VOQ) 1001 implemented and adapted to store a master change notification list that is shared by all peers 907a–n. This queue is after the VCN model described above. Further, VOQ 1001 is tiered into two priority levels, one tier for change notifications (CNs), and one tier for delete notifications (DNs). For the purpose of this specification, a CN is a NLRI that has a modified NLRE state. A DN is a NLRI that no longer has a reachable NLRE and therefore is to be withdrawn from the routing information base of all peers 907a–n. In a preferred embodiment CNs are maintained in VOQ 1001 in a manner that each peer may receive change notifications at its own best rate. Also in a preferred embodiment DNs are implemented separately from CNs within VOQ 1000, and are prioritized such that DNs are processed before CNs. A queue access (Q-A) module 1002 is provided within BGP module 1000 and illustrated as logically associated with VOQ 1001 by a bi-directional arrow. Q-A module 1002 is adapted to provide synchronized and priority access to VOQ 1001 on behalf of peers 907a–n, and to utilize senders 906a–n to send change notification to the peers. VOQ 1001 is a FIFO queue with regard to the way messages are processed, with the exception that the DN tier is prioritized. The prioritization scheme is accomplished in one embodiment by "double linking". For example, when Q-A 1002 accesses VOQ 1001 on behalf of a peer, it will first link to the DN list. If there are any NLRIs in the DN list, these will be processed on a FIFO basis. When the Q-A has processed completely from the DN list for a particular peer, it moves to the head of the CN list and begins processing from that list. If there are no DN entries upon access to VOQ 1001, then the lower-priority link is asserted pointing to the CN list of entries.

By providing a single buffer instead of multiple buffers holding the same information, circuitry required for outbound packet buffering is minimized. In a preferred embodiment all peers (907a–n) in a peer group receive notifications at their own speed, and an NLRI is not removed from VOQ 1001 until the particular NLRI has been accessed on behalf of all peers. In one embodiment this is accomplished by establishing an increment system wherein an entry is first associated with a flag having a value equal to the number of active peers. Then the value is decremented each time a peer has processed it until the value has reached 0, meaning that all peers have processed the message. The total increments in a fresh NLRI equals the number of peers that need to process the change, to or the total number of peers in a group. More detail about the functions of VOQ 1001 are provided below.

Figure 11:
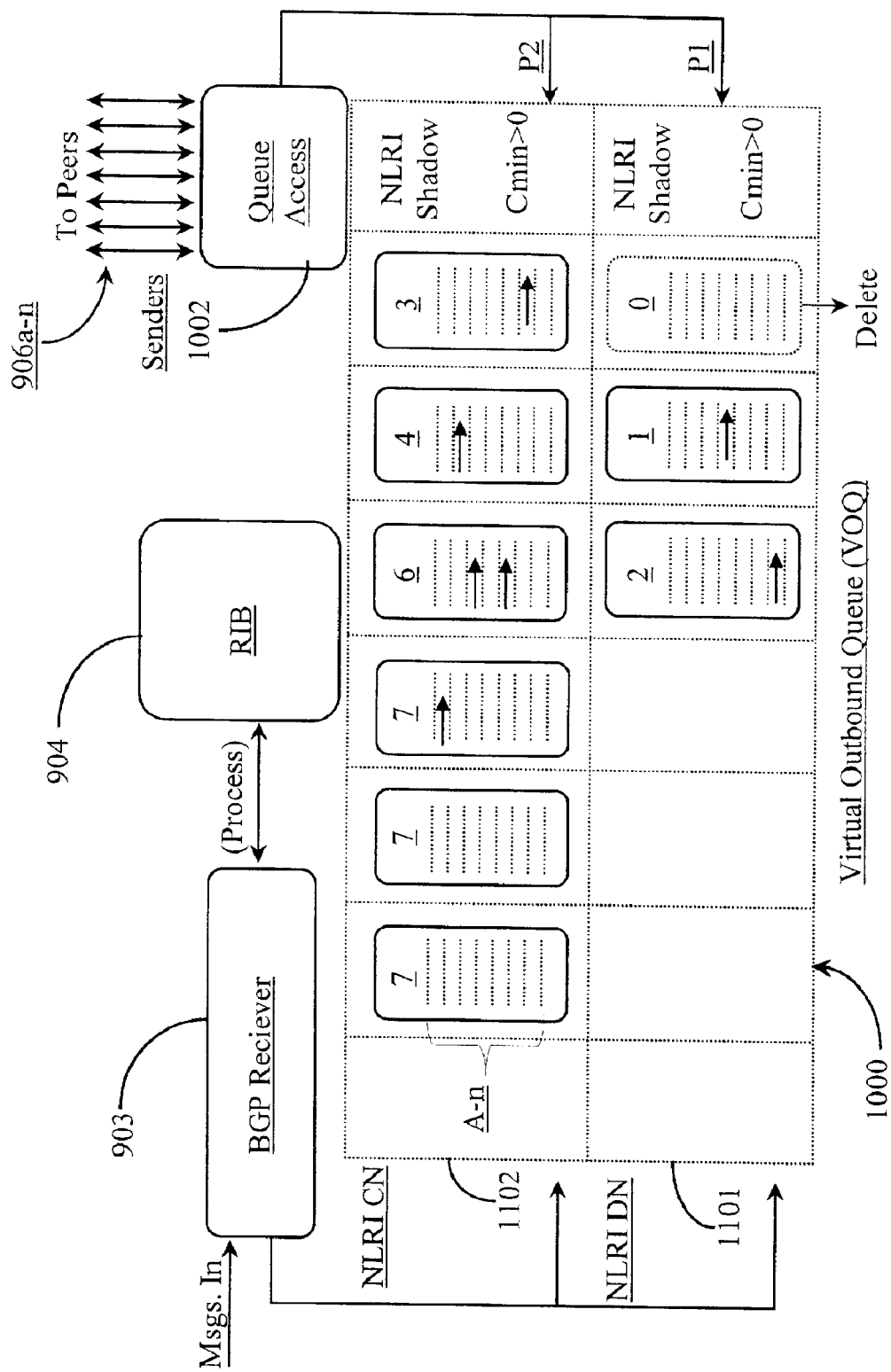
FIG. 11 is a block diagram illustrating logical function of a virtual notification queue according to an embodiment of the present invention.

FIG. 11 is a block diagram illustrating logical functions of virtual notification queue 1001 of FIG. 10 and the queue access module according to an embodiment of the present invention. This figure is analogous to FIG. 13 described above, but with more structural detail for the particular application of distributing NLRI messages to peers. Again, elements included herein that were introduced with respect to the description above retain their previous numbers. VOQ 1001 is logically divided in this example into 2 tiers, as was described above. These are NLRI CN 1102 and NLRI DN 1101. CN 1102 contains NLRIs for peer processing that have a modified or changed NLRE state. DN 1101 contains all NLRIs for peer processing that no longer have any NLREs associated with them, and therefore are marked as delete notifications because they are no longer reachable from the viewpoint of the processing peer.

BGP receiver 903 receives peer messages and processes them against RIB 904 as previously described. Those changes that will be propagated to peers are en-queued in VOQ 1001 according to qualification. NLRIs marked for changed NLRE are en-queued in CN tier 1102. Those NLRIs marked for deletion are en-queued into DN tier 1101.

Senders 906a–n are represented in this example by a plurality of bi-directional arrows illustrated above queue-access module 1002. Peers are not illustrated in this example. In this example, there are 7 senders representing 7 peers in a peer group. Access to VOQ 1001 by Q-A module 1002 on behalf of peers is illustrated by an access line connecting Queue Access module 1002 to both CN and DN tiers. Access to DN 1101 is logically illustrated by a portion of the access line labeled P1 (priority 1) and access to CN 1102 is logically illustrated by a portion of the access line labeled P2 (priority 2). Whenever Q-A 1002 accesses VOQ 1001 on behalf of a peer, it does so according to priority with a highest priority link pointing to DN 1101 (P1). The lower priority link (P2) points to CN 1102. In this way all DN messages are processed in FIFO order first. When an assert of P1 shows no entries to process, P2 is immediately asserted for outbound access and processing. This double linking technique enables prioritization of two separate FIFO lists in a same queue. It is assumed in this example that all peers in the peer group share the same outbound policy and therefore are to receive the same outbound messages in FIFO order with DN entries taking priority.

In the present example of FIG. 11 there are 6 NLRIs for processing in NLRI-CN 1102 and 3 NLRIs for processing in NLRI-DN 1101, for a total of 9 NLRIs currently en-queued for processing. It is noted herein that each NLRI is logically illustrated with 7 entry spaces labeled a–g, each space bounded by dotted lines. This logical representation enables explanation of a bookmark method that is used for each peer uses to mark where processing for that peer left off, subsequent advertisement intervals. VOQ 1001 is processed in data chunks. Processing for each peer needs to be able to go directly back to where it was in terms of queue processing as represented by queue senders. Arrows logically inserted into individual ones of spaces a-g in certain NLRIs indicate bookmarks, or reference pointers.

Any NLRI en-queued in NLRI-CN list 1102 can be moved into NLRI-DN list 1101 if conditions warrant. For example, a new message received at BGP receiver 903 may comprise deletion of an NLRI that is currently in NLRI-CN 1102 advertising a new NLRE. Similarly, a NLRI marked deleted and en-queued in NLRI-DN list 1101 can be moved to CN list 1102 if a new message arrives wherein a reachable NLRE is established for the prefix. As long as no processing is being done for peers for a NLRI that needs to be moved, the move can take place. Such a move is conducted according to FIFO rules.

In one embodiment each NLRI illustrated in VOQ 1001 has an associated increment value logically illustrated herein as a real number. Reading from right to left (head to back) in CN list 1102 the increment values are 3, 4, 6, 7, 7, and 7 for the 6 NLRIs en-queued therein. An increment of 7 in this example indicates that no senders have accessed the particular NLRI exhibiting the increment. An increment value of 6 for an NLRI indicates that one sender has processed the NLRI. An increment value of 4 indicates that 3 senders have processed the NLRI and so on. Reading from right to left (queue order) in DN list 1101, the increments for the 3 NLRIs en-queued therein read 0, 1, and 2. The increment 0 associated with the NLRI at the head of DN list 1101 indicates that all peers in the group have processed the message and that it may now be deleted from VOQ 1001. This is further illustrated by a broken boundary and arrow labeled Delete.

It is noted herein that a shadow NLRI is provided at the ultimate head of each list, labeled NLRI Shadow. The counter rule of a shadow entry is that the provided peer counter must read at a minimum greater than 0 (Cmin>0). Because of this rule, the shadow entry for each of lists CN and DN is never deleted from VOQ 1001.

In this example, it can be seen that all peers have completed the first NLRI in DN 1001. All but one peer of the group has completed the second NLRI in DN list 1101 with peer d marked (arrow inserted) as the next peer to access that NLRI. The third NLRI in DN list 1101 shows that 5 peers have completed processing. The inserted arrow signifies that peer n has the NLRI referenced.

Moving up to CN list 1102, once peers have completed DN processing they begin to process NLRIs in CN list 1102. For example, the NLRI at the head of CN list 1102 has an increment value of 3 meaning that 4 peers have completed processing of that NLRI with 3 to go. Peer f is the peer currently processing the first NLRI in list 1102 as illustrated by a reference pointer in space f. The second NLRI in CN list 1102 has an increment value of 4 indicating that 3 peers have completed processing and 4 peers have not. Peer b is currently processing the second NLRI in CN list 1102 as indicated by reference pointer in space b. The third NLRI en-queued in list 1102 has a current increment value of 6, meaning that only one peer has completed processing. Peers c and e are currently working or looking at the third NLRI in list 1102 as indicated by reference pointers visible in spaces c and e. The fourth NLRI en-queued in list 1102 has not yet been processed by any peer, however peer a is currently working it as indicated by the reference pointer in space a. The remaining NLRIs have not been processed and are not yet being looked at as indicated by full (7) increment value and no illustrated reference pointers.

It is noted herein that if a change notification for an NLRI already in NLRI-CN list 1102 comes into receiver 903 wherein the notification is a delete notification, then the effected NLRI in NLRI-CN list 1102 needs to be moved to NLRI-DN list 1101 at the back of the queue. This can not happen while the NLRI is being processed for any peer or peers. In the case of active peer referencing, the affected NLRI is simply marked deleted so that subsequent accessing peers will "see" the delete flag and skip processing. At this point the affected NLRI is moved to the NLRI-DN list. Because of priority linking, processing will be picked up again in the NLRI-DN list at subsequent intervals. Similarly, a DN NLRI can be moved into the CN list in the same fashion in reverse order according to the same rules.

It is noted herein that each peer in a peer group has an advantageous interval for which it can accept advertisements. All peers are, in the prior art, configured as a group to a default group advertisement interval, however, using a virtual NLRI list as described herein, each peer can receive notifications as fast as it is able, while processing is proceeding on behalf of that peer. In the descriptions thus far it has been made clear, for a preferred embodiment of the invention, that queue 1001 is accessed by Q-A module 1002 on behalf of peers in the peer group, and access is provided for a particular peer at a pre-programmed interval. When the queue is being processed on behalf of a particular peer, processing is done, and notifications are sent to the peer by the associated sender at a rate that the peer can accept them. This rate is set for each peer in module 1000 when peers are configured into a group. This process is very much like a peer gaining access to the queue and processing the queue itself, pulling the notifications at its best rate, when it is granted access.

Figure 12:
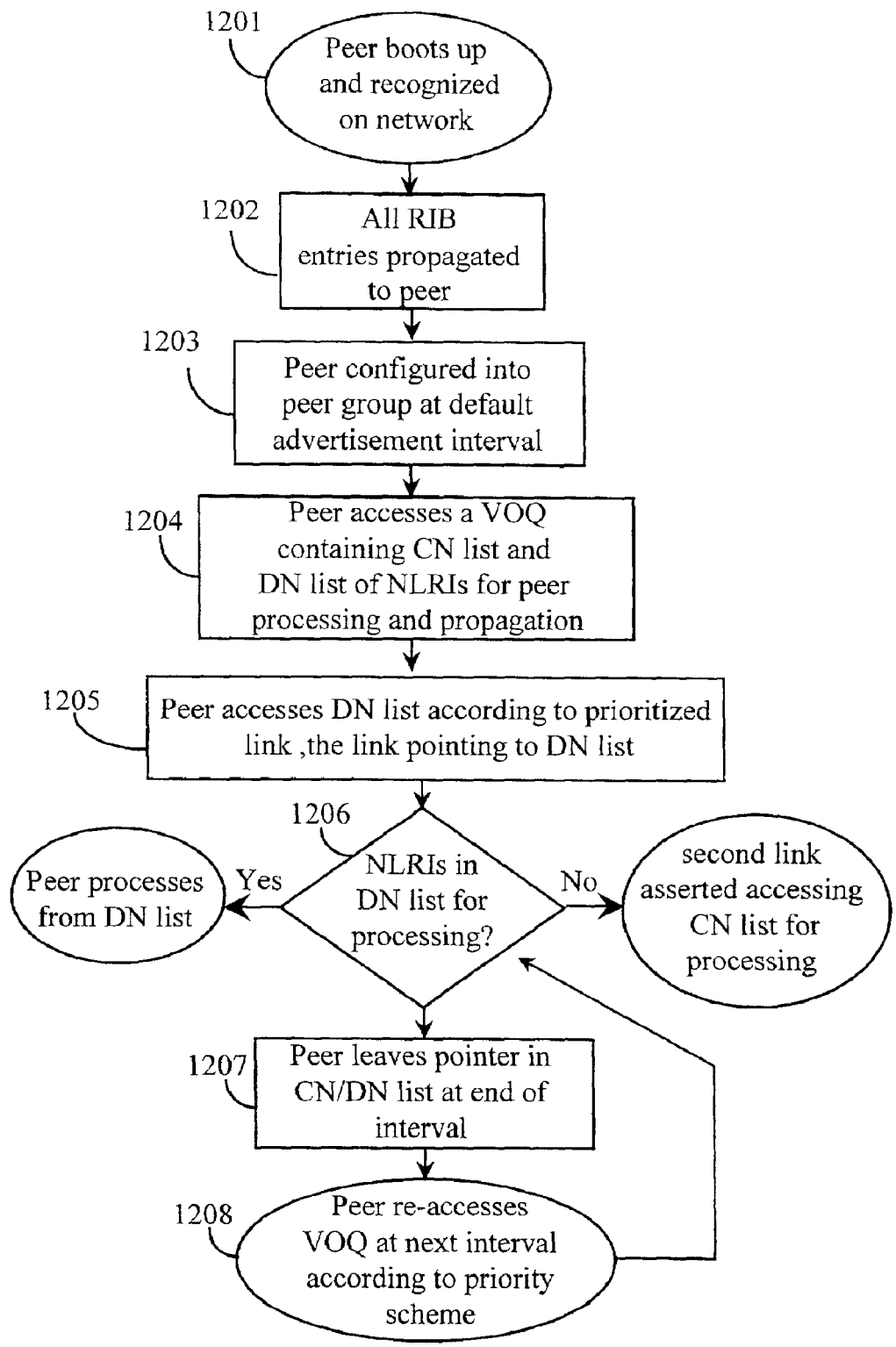
FIG. 12 is a flow diagram illustrating steps for propagating notifications to a peer according to an embodiment of the present invention.

FIG. 12 is a process flow diagram illustrating basic steps for peer processing of outbound notification lists according to an embodiment of the present invention. At step 1201, a peer is booted up and is recognized by neighboring peers. At step 1202, all of the RIB entries are propagated to the just-recognized peer. At step 1203, the peer is configured into a peer group at a default advertisement interval for outbound queue processing. At step 1204, a VOQ containing CN list and DN list of NLRIs is accessed for a peer. At step 1205, the DN list is accessed according to a prioritized link in a double-linking scheme, the priority link pointing to the DN list.

At step 1206, if there are no NLRIs in DN list for processing, then the lower priority link is asserted and access is made to the CN list and processing begins. If at step 1206 there are NLRIs in the DN list for processing, then processing begins for the DN NLRIs. At step 1207, a bookmark is left in the CN/DN list, the bookmark referencing a point-to-resume for the next interval of access for the same peer. The bookmark enables processing to begin for the same peer where it left off in the CN/DN list. At step 1208, re-access is made to the VOQ according to the default priority link. If at step 1208, there are no NLRIs in the DN list, the lower priority link to the CN list is asserted, and processing begins where it left off in the previous access for the same peer.

Processing always begins again with respect to both lists where it last left off due to bookmarking at the end of every access cycle. By default, re-access to the VOQ always points first to the DN list as a priority. In this way, NLRIs marked deleted are always propagated first.

After the VOQ is accessed for one peer, and the interval times out, with the bookmark inserted for re-access, access is made for another peer in the peer group. The cycle for indexing peers can be any of many schemes. In one embodiment a round-robin schema may be used, where access is made for each peer for a same length of time, and access is then made for each of the other peers in the group before returning to the first peer. In another scheme, times for access may be varied according to needs of peers. A very slow peer, for example, may be granted more time than a very fast peer. Other weighting schemes may be used as well, including making more accesses for some peers than for others in a cycle.

It will be apparent to one with skill in the art that the basic process illustrated herein can be further granularized by adding more steps and/or sub-steps without departing from the spirit and scope of the present invention. For example, in one embodiment a process loop might be added to this basic process for treatment of a slow peer including steps of creating a separate list and thread for the slow peer and a step for reintegrating the peer back into the peer group functioning at the default advertisement interval. Also, in one embodiment steps may be added for moving an NLRI from one list to another list (CN to DN or DN to CN). Such steps may include counter re-sets and a step for a subsequent peer ignoring a flagged NLRI that has been marked deleted.

It will be apparent to one with skill in the art that the method and apparatus of the present invention is equally applicable to single processor routers as well as to multiple processor routers. It will also be apparent to one with skill in the art that in the case of implementation on multiple processor routers, that multiple BGP peers may be within a same router. In one embodiment BGP peers in a group may include both internal and external BGP peers. In another embodiment, the method and apparatus of the invention can be applied to other routing protocols such as Open Shortest Path First (OSPF) as well as others. There are many possibilities.

The description of the present invention is intended to be illustrative, and not to limit the scope of the appended claims. Many alternatives, modifications, and variations will be apparent to those skilled in the art, without departing from the spirit and scope of the invention.

What is claimed is:

1. A data routing software structure on a computer comprising:
   a list of event objects;
   one or more producers creating the event objects for the list; and
   a finite set of consumers accessing the object list;
   characterized in that the event objects are each associated with a reference number indicating a number of the consumers currently accessing the event object, and in that, as each consumer completes access the reference number is decremented, and when the reference number for an event object is zero, and the event object is at the head of the list, indicating that all consumers have accessed the object, that event object is removed from the list.

2. The data routing software structure on the computer of claim 1 wherein the event objects created represent changes in a data base, and the information associated with each is a statement of the change.

3. The data routing software structure on the computer of claim 2 wherein the data base is a routing information base for a portion of a data packet network, and the information associated with each event object is a route change.

4. The data routing software structure on the computer of claim 1 wherein each event object comprises a reference to the next event object in the list.

5. The data routing software structure on the computer of claim 1 wherein each event object comprises a reference to the next event to be processed by a consumer processing a current event object.

6. The data routing software structure on the computer of claim 1 having a second reference number associated with each event object, initially indicating the number of consumers to access the event object, the number decremented as each consumer accesses the event object.

7. A method for propagating event objects to a finite set of consumers, comprising the steps of:
  (a) placing the event objects one-at-a-time in a first-in-first-out queue;
  (b) associating a number with each specific event object in the list, the number indicating the number of consumers in the set currently accessing the specific event object; and
  (c) decrementing the number associated in step (b) with each event object by one each time a consumer finishes access to that event object, such that, when the number is zero for an event object, and the event object is at the head of the queue, that object has been accessed for all consumers requiring access, and may be removed from the queue.

8. The method of claim 7 wherein the event objects created represent changes in a data base, and the information associated with each is a statement of the change.

9. The method of claim 8 wherein the data base is a routing information base for a portion of a data packet network, and the information associated with each event object is a route change.

10. The method of claim 7 wherein each event object comprises a reference to the next event object in the queue.

11. The method of claim 7 wherein each event object comprises a reference to the next event to be processed by a consumer processing a current event object.

12. The method of claim 7 having a second reference number associated with each event object, initially indicating the number of consumers to access the event object, the number decremented as each consumer accesses the event object.

13. A method for propagating route changes to a finite set of peer routers, comprising the steps of:
  (a) placing the route changes as event objects one-at-a-time in a first-in-first-out queue;
  (b) associating a number with each specific event object in the queue, the number indicating the number of peers in the set currently accessing the specific event object; and
  (c) decrementing the number associated in step (b) with each event object by one each time a peer finishes access to that event object, such that, when the number is zero for an event object, and the event object is at the head of the queue, that object has been accessed for all peers requiring access, and may be removed from the queue.

14. The method of claim 13 wherein each event object comprises a reference to the next event object in the queue.

15. The method of claim 13 wherein each event object comprises a reference to the next event to be processed by a peer processing a current event object.

16. The method of claim 13 having a second reference number associated with each event object, initially indicating the number of peers to access the event object, the number decremented as each peer accesses the event object.

17. A method for propagating route changes to a finite set of processor-controlled peer nodes in a multiple-processor router, comprising the steps of:
  (a) placing the route changes as event objects one-at-a-time in a first-in-first-out queue;
  (b) associating a number with each specific event object in the queue, the number indicating the number of nodes in the set currently accessing the specific event object; and
  (c) decrementing the number associated in step (b) with each event object by one each time a node finishes access to that event object, such that, when the number is zero for an event object, and the event object is at the head of the queue, that object has been accessed for all nodes requiring access, and may be removed from the queue.

18. The method of claim 17 wherein each event object comprises a reference to the next event object in the queue.

19. The method of claim 17 wherein each event object comprises a reference to the next event to be processed by a node processing a current event object.

20. The method of claim 17 having a second reference number associated with each event object, initially indicating the number of nodes to access the event object, the number decremented as each node accesses the event object.

* * * * *